(12) United States Patent
Orito

(10) Patent No.: US 11,587,459 B2
(45) Date of Patent: Feb. 21, 2023

(54) DISPLAY, DISPLAY METHOD, AND DISPLAY SYSTEM

(71) Applicant: Mitsubishi Electric Corporation, Tokyo (JP)

(72) Inventor: Koichi Orito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 525 days.

(21) Appl. No.: 16/613,438

(22) PCT Filed: Jul. 12, 2018

(86) PCT No.: PCT/JP2018/026303
§ 371 (c)(1),
(2) Date: Nov. 14, 2019

(87) PCT Pub. No.: WO2019/021840
PCT Pub. Date: Jan. 31, 2019

(65) Prior Publication Data
US 2020/0168118 A1 May 28, 2020

(30) Foreign Application Priority Data

Jul. 24, 2017 (JP) .................... PCT/JP2017/026616

(51) Int. Cl.
*G09B 19/00* (2006.01)
*G09B 5/02* (2006.01)
(Continued)

(52) U.S. Cl.
CPC .......... *G09B 19/003* (2013.01); *G06F 3/147* (2013.01); *G06N 20/00* (2019.01); *G09B 5/02* (2013.01)

(58) Field of Classification Search
None
See application file for complete search history.

(56) References Cited

U.S. PATENT DOCUMENTS

2007/0297557 A1 12/2007 Kuwatani
2016/0085235 A1 3/2016 Kamijo
2016/0156792 A1 6/2016 Kowaka

FOREIGN PATENT DOCUMENTS

JP 2007-323396 A 12/2007
JP 2012-084162 A 4/2012
(Continued)

OTHER PUBLICATIONS

Office Action dated Aug. 25, 2020 in German Patent Application No. 11 2018 003 770.3, 12 pages.
(Continued)

*Primary Examiner* — David H Chu
(74) *Attorney, Agent, or Firm* — Xsensus LLP

(57) ABSTRACT

A display includes a calculation unit to calculate, when first and second events that occur in an external device are transmitted from the external device, operating time from when the first event is ended by operation for the first event to when the second event is ended by operation for the second event; a storage unit to store operating procedures that are histories of the operation for the second event and the associated operating times; and a display unit to display any of the operating procedures in the storage unit, according to instruction from the calculation unit. When the second event is newly transmitted after the calculation of the operating time is completed, the calculation unit selects an operating procedure used for operation guidance from among the operating procedures based on the operating times and causes the display unit to display the selected operating procedure, thereby executing the operation guidance.

11 Claims, 9 Drawing Sheets

(51) Int. Cl.
 *G06N 20/00* (2019.01)
 *G06F 3/147* (2006.01)

(56) References Cited

FOREIGN PATENT DOCUMENTS

JP  2014-232377 A  12/2014
JP   2016-66200 A   4/2016

OTHER PUBLICATIONS

Office Action dated Jul. 29, 2021 in Indian Patent Application No. 201927045378, 6 pages.
International Search Report and Written Opinion dated Sep. 11, 2018 for PCT/JP2018/026303 filed on Jul. 12, 2018, 10 pages including English Translation of the International Search Report.

|  | OPERATING PROCEDURE | OPERATING TIME (SEC.) |
|---|---|---|
| FIRST EVENT | A, B, C | 10 |
|  | ⋮ | ⋮ |
|  | A, B, D, E | 15 |
|  | ⋮ | ⋮ |
| SECOND EVENT | D, E | 2 |
|  | ⋮ | ⋮ |
|  | F | 1 |
|  | ⋮ | ⋮ |

DISPLAY, DISPLAY METHOD, AND DISPLAY SYSTEM

CROSS-REFERENCE TO RELATED APPLICATIONS

The present application is based on PCT filing PCT/JP2018/026303, filed Jul. 12, 2018, which claims priority to PCT filing PCT/JP2017/026616, filed Jul. 24, 2017, the entire contents of each are incorporated herein by reference.

FIELD

The present invention relates to a display, a display method, and a display system for guiding an operator through an operating procedure.

BACKGROUND

In a control system including a control device that controls a device to be controlled, and a display that displays information collected by the control device, when a problem occurs in the device to be controlled and an alarm is generated, an operator operates the display or a control panel to correct data that has caused the generation of the alarm.

The display of such a control system guides the operator through an operating procedure in order to facilitate operation by the operator. An operation support device of Patent Literature 1 selects an operating procedure on the basis of the operating time that is the time required for operation and uses the selected operating procedure for operation guidance.

CITATION LIST

Patent Literature

Patent Literature 1: Japanese Patent Application Laid-open No. 2014-232377

SUMMARY

Technical Problem

However, Patent Literature 1, which is the above-described conventional technique, has a problem in that when a plurality of events occur, the operating time required for a sequence of operations is calculated. This means that the accurate operating time for each event cannot be calculated.

The present invention has been made in view of the above. It is an object of the present invention to provide a display capable of guiding an operator through a proper operating procedure for each event even when a plurality of events occur.

Solution to Problem

In order to solve the above-described problem and achieve the object, an aspect of the present invention provides a display including a calculation unit to calculate, when a first event and a second event that occur in an external device are transmitted from the external device, an operating time that is a time from when the first event is ended by operation for the first event to when the second event is ended by operation for the second event. The display of the present invention further includes a storage unit to store operating procedures that are histories of the operation for the second event and the operating times associated with the operating procedures; and a display unit to display any of the operating procedures in the storage unit, according to an instruction from the calculation unit. In the display of the present invention, when the second event is newly transmitted after the calculation of the operating time is completed, the calculation unit selects an operating procedure used for operation guidance from among the operating procedures in the storage unit on a basis of the operating times in the storage unit and causes the display unit to display the selected operating procedure, thereby executing the operation guidance.

Advantageous Effects of Invention

The display according to the present invention has an advantage of being able to guide an operator through a proper operating procedure for each event even when a plurality of events occur.

DESCRIPTION OF EMBODIMENTS

Hereinafter, a display, a display method, and a display system according to embodiments of the present invention will be described in detail with reference to the drawings. Note that these embodiments are not intended to limit this invention.

First Embodiment

Figure 1:
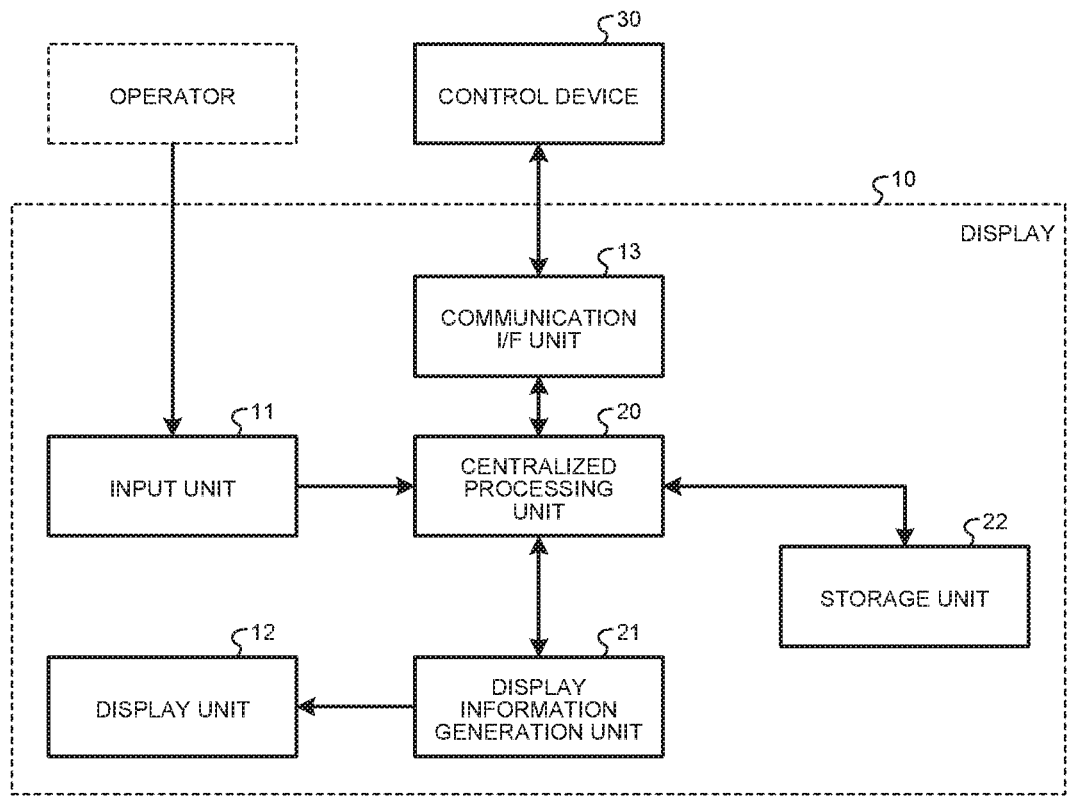
FIG. 1 is a diagram illustrating the configuration of a display according to a first embodiment of the present invention.

FIG. 1 is a diagram illustrating the configuration of a display according to a first embodiment of the present invention. A display 10 is a device that displays various kinds of information and accepts operation by an operator.

The display 10 is connected to a control device 30, and displays various kinds of information such as history information on operation processing by an operator, information for guiding an operator through an operating procedure, and event information described later transmitted from the control device 30. The event information is information on an event such as generation of an alarm.

The control device 30 is a controller such as a Programmable Logic Controller (PLC), and controls a device to be controlled (not illustrated). An example of the event information transmitted from the control device 30 is an alarm that is generated when a failure occurs in the device to be controlled or a setup change at a product changeover. When the event information is generation of an alarm, the event information includes information indicating which failure has occurred in which device to be controlled. When the event information is a setup change at a product changeover, the event information includes information indicating from which kind of products to which kind of products the kind of products to be produced has been changed. The event information also includes information on the date and time at which the event has occurred. When the event information is transmitted from the control device 30, the display 10 accepts an operation by an operator and transmits information corresponding to the operation to the control device 30. An example of the operation by the operator is a button press or a numerical value input.

When an event occurs and operation is performed by the operator to eliminate the cause of the event, the display 10 stores an operating time that is the time required for the operation and the event in association with each other. When a plurality of events occur, the display 10 of the first embodiment calculates an operating time for each event, and stores the events and the operating times in association with each other. When the same event as a stored event newly occurs, the display 10 performs display for guiding the operator through an operating procedure, on the basis of stored information. Thus, the display 10 has an operation input guidance function for an operator.

The display 10 includes an input unit 11 that accepts operation from an operator, a display unit 12 that displays information for guiding the operator through an operating procedure when an event occurs, and a communication interface (I/F) unit 13 that communicates with the control device 30.

The display 10 also includes a centralized processing unit 20 that provides overall control of the entire processing of the display 10 and is a calculation unit that calculates an operating time for each event, and a display information generation unit 21 that generates information to be displayed on the display unit 12. The display 10 also includes a storage unit 22 that stores operation history information 101 described later in which an operating procedure by an operator and an operating time are associated with each other.

The display 10 may have a touch panel in which the input unit 11 and the display unit 12 are combined. In the following description, a case where the display 10 has a touch panel having the function of the input unit 11 and the function of the display unit 12 will be described.

The display unit 12 in the touch panel displays information such as characters, numbers, symbols, tables, figures, and pictures generated by the display information generation unit 21. To display information for guiding an operator through an operating procedure, the display unit 12 displays an object in a position to be touched by the operator in a mode different from that of the other regions by changing its display mode such as color, the way it is illuminated, or contrast. The object here is an object to be operated on a screen. An example of the object whose display mode is changed by the display unit 12 is a button. In this case, the display unit 12 displays the button in a display mode different from that of the other regions, thereby guiding the operator to an operation on the specific button.

When a touch screen that is a screen of the touch panel is pressed by the operator, the input unit 11 in the touch panel accepts an operation corresponding to the pressed position. The input unit 11 inputs position information indicating the position pressed by the operator to the centralized processing unit 20.

The communication I/F unit 13 is connected to the control device 30 that is an external device, and performs communication with the control device 30 in accordance with instructions from the centralized processing unit 20. The external device is not limited to the control device 30, and may be a sensor or a robot. Upon receiving event information from the control device 30, the communication I/F unit 13 transmits the received event information to the centralized processing unit 20. The communication I/F unit 13 transmits information corresponding to operation processing by the operator to the control device 30. Event information that the control device 30 transmits to the communication I/F unit 13 includes information indicating that a bit is turned on when an event occurs, and includes information indicating that the bit is turned off when the event ends.

The centralized processing unit 20 transmits details of event information transmitted via the communication I/F unit 13 to the display information generation unit 21. The centralized processing unit 20 detects which operation has been performed by the operator, on the basis of information displayed on the display unit 12 and position information transmitted from the input unit 11. Alternatively, the input unit 11 may generate operation information indicating which operation has been performed by the operator, on the basis of position information and information displayed on the display unit 12, and transmit the generated operation information to the centralized processing unit 20.

For a first event described later that is the first event, the centralized processing unit 20 calculates an operating time that is the time between the timing of occurrence of the event and the end of the event. For a second event described later that is the second event, the centralized processing unit 20 calculates an operating time between the timing of starting working on the event, not the timing of occurrence of the event, and the end of the event. The centralized processing unit 20 creates the operation history information 101 in which an event that has occurred, an operating procedure for the event by the operator, and an operating time are associated with each other. The centralized processing unit 20 stores the operation history information 101 in the storage unit 22, thereby accumulating the operation history information 101.

When the same event as an event included in the operation history information 101 newly occurs after the operation history information 101 is accumulated, the centralized processing unit 20 generates a guidance instruction to guide the operator to a button operation for the new event, and transmits it to the display information generation unit 21. The centralized processing unit 20 also generates a display instruction to display event information and transmits it to the display information generation unit 21.

The display information generation unit 21 generates display information such as characters, numbers, symbols, tables, figures, and pictures for displaying various kinds of information such as event information and buttons for operation guidance, in accordance with instructions from the centralized processing unit 20. The display information generation unit 21 causes the display unit 12 to display the generated display information.

Figure 2:
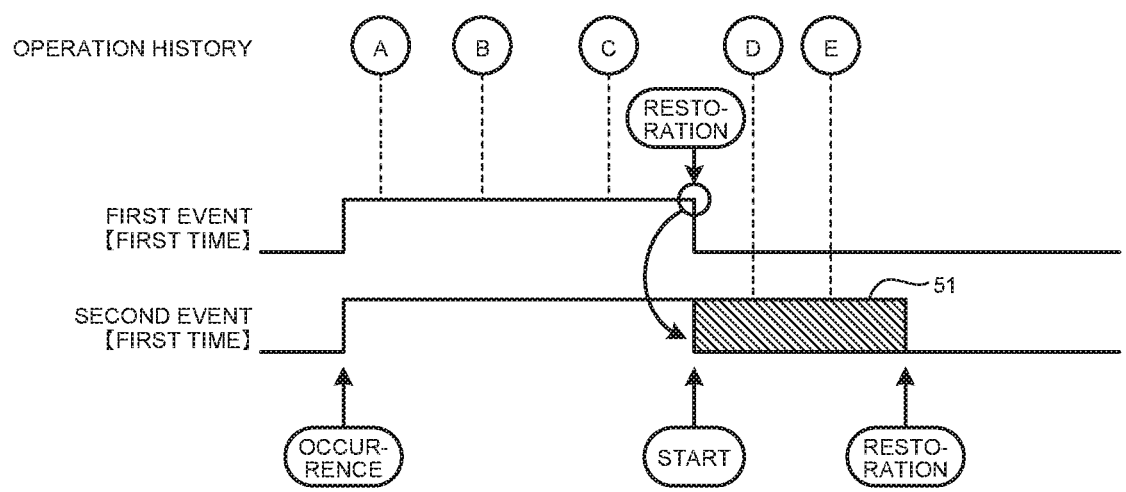
FIG. 2 is a diagram illustrating a first example of an operating procedure according to the first embodiment.
Figures 3, 4:
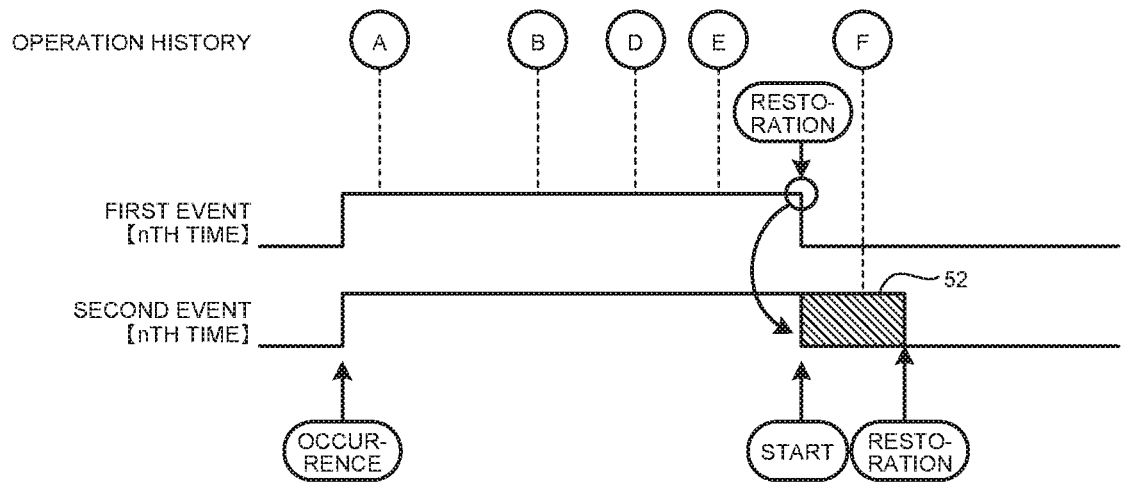
FIG. 3 is a diagram for explaining a second example of an operating procedure according to the first embodiment.
FIG. 4 is a diagram illustrating the configuration of operation history information according to the first embodiment.

Next, an example of an operating procedure when an event occurs will be described. FIG. 2 is a diagram illustrating a first example of an operating procedure according to the first embodiment. FIG. 3 is a diagram for explaining a second example of an operating procedure according to the first embodiment. FIGS. 2 and 3 illustrate examples of an operating procedure when the first event and the second event occur. The following describes a case where the first event and the second event are generation of alarms caused by failures.

The control device 30 transmits the same type of event to the display 10 a plurality of times. Here, a case will be described in which the control device 30 transmits the first event and the second event to the display 10 n times where n is a natural number of two or more. When the display 10 receives the first event and the second event, the display 10 displays the first event and the second event. This allows the operator to select one of the first event and the second event for which to perform operation. Here, a case will be described in which the first event is selected for operation, and then the second event is selected for operation.

FIG. 2 illustrates an example of an operating procedure for the first event and the second event that have occurred for the first time. FIG. 3 illustrates an example of an operating procedure for the first event and the second event that have occurred for the nth time. Operations A, B, C, D, and E illustrated in FIG. 2 constitute an operation history that indicates an operating procedure when the first event and the second event have occurred for the first time. Operations A, B, D, E, and F illustrated in FIG. 3 constitute an operation history that indicates an operating procedure when the first event and the second event have occurred for the nth time.

As illustrated in FIG. 2, when the operation A for the first event is performed by the operator after the first event and the second event have occurred for the first time, the display 10 accepts the operation A and transmits information corresponding to the operation A to the control device 30. When the operation B for the first event is performed by the operator after the operation A, the display 10 accepts the operation B and transmits information corresponding to the operation B to the control device 30. When the operation C for the first event is performed by the operator after the operation B, the display 10 accepts the operation C and transmits information corresponding to the operation C to the control device 30. Consequently, the control device 30 eliminates the failure corresponding to the first event, restoring the state of the device to be controlled. An example of the failure is that material used by the device to be controlled runs out, the pressure in the device to be controlled exceeds a reference value, or a sensor provided at the device to be controlled detects an abnormal value.

Thereafter, the display 10 starts working on the second event, and accepts an operation for the second event. When the operation D for the second event is performed by the operator, the display 10 accepts the operation D and transmits information corresponding to the operation D to the control device 30. When the operation E for the second event is performed by the operator after the operation D, the display 10 accepts the operation E and transmits information corresponding to the operation E to the control device 30. Consequently, the control device 30 eliminates the failure corresponding to the second event, restoring the state of the device to be controlled.

The time required for restoration from the failure corresponding to the first event is the time between the occurrence of the first event and the end of the first event. The time between the occurrence and the end of the first event is the operating time for the first event.

When the first event ends, the failure for the second event can start being worked on. Thus, the timing at which the first event ends is the timing at which the failure for the second event starts being worked on. Thus, the time required for restoration from the second event is the time between the end of the first event and the end of the second event. The operating time between the end of the first event and the end of the second event is an operating time 51 for the second event. In other words, the operating time between the restoration from the first event and the restoration from the second event is the operating time 51 for the second event.

If the operating time for the second event is between the occurrence and the end of the second event, the time during which the failure for the first event has been worked on is included in the operating time for the second event. The time during which the failure for the first event has been worked on is a period of time during which the failure for the second event cannot be worked on, and therefore it should not be included in the operating time for the second event. Thus, in the first embodiment, the centralized processing unit 20 calculates the time between the end of the first event and the end of the second event, and sets the calculated time as the net operating time 51 for the second event. In other words, the time between the end of the first event and the end of the second event is the net required time required for the operation for the second event.

The centralized processing unit 20 associates the calculated first operating time for the first event, the first event, and the order the operation A, the operation B, and the operation C, which is the first operating procedure for the first event, with each other, and stores them in the storage unit 22. The centralized processing unit 20 also associates the calculated first operating time 51 for the second event, the second event, and the order the operation D and the operation E, which is the first operating procedure for the second event, with each other, and stores them in the storage unit 22. At this time, the centralized processing unit 20 registers the associated information in the operation history information 101 in the storage unit 22.

As illustrated in FIG. 3, when the operation A for the first event is performed by the operator after the first event and the second event have occurred for the nth time, the display 10 accepts the operation A and transmits the information corresponding to the operation A to the control device 30. When the operation B for the first event is performed by the operator after the operation A, the display 10 accepts the operation B and transmits the information corresponding to the operation B to the control device 30. When the operation D for the first event is performed by the operator after the operation B, the display 10 accepts the operation D and transmits the information corresponding to the operation D to the control device 30. When the operation E for the first event is performed by the operator after the operation D, the display 10 accepts the operation E and transmits the information corresponding to the operation E to the control device 30. Consequently, the control device 30 eliminates the failure corresponding to the first event, restoring the state of the device to be controlled.

Thereafter, the display 10 starts working on the second event, and accepts an operation for the second event. When the operation F for the second event is performed by the operator, the display 10 accepts the operation F and transmits information corresponding to the operation F to the control device 30. Consequently, the control device 30 eliminates the failure corresponding to the second event, restoring the state of the device to be controlled.

The centralized processing unit 20 associates the calculated nth operating time for the first event, the first event, and the order the operation A, the operation B, the operation D, and the operation E, which is the nth operating procedure for the first event, with each other, and stores them in the storage unit 22. The centralized processing unit 20 also associates the calculated nth operating time 52 for the second event, the second event, and the operation F, which is the nth operating procedure for the second event, with each other, and stores them in the storage unit 22. At this time, the centralized processing unit 20 registers the associated information in the operation history information 101 in the storage unit 22. In this way, the display 10 acquires and accumulates an operation history when the display 10 is operated in the same time series.

After this, when the first event newly occurs, the centralized processing unit 20 selects an operating procedure for eliminating the failure of the first event, and when the second event newly occurs, it selects an operating procedure for eliminating the failure of the second event. At this time, the centralized processing unit 20 selects an operating procedure with the shortest operating time from among operating procedures registered in the operation history information 101. When the operating time of the operating procedure for the first-time first event is the shortest among operating procedures for the first event, the centralized processing unit 20 selects the operating procedure for the first-time first event. When the operating time 52 of the operating procedure for the nth-time second event is the shortest among operating procedures for the second event, the centralized processing unit 20 selects the operating procedure for the nth-time second event. Thus, the display 10 of the first embodiment selects an operating procedure with the shortest net required time actually required between the start of working on an event and the end of the event from the operation history information 101.

FIG. 4 is a diagram illustrating the configuration of the operation history information according to the first embodiment. The operation history information 101 is information in which operating procedures, which are operation histories, and operating times are associated with each other for each event. In the example illustrated in FIG. 4, the first event, an operating procedure the operation A followed by the operation B followed by the operation C, and an operating time of ten seconds are associated with each other. The operating procedure the operation A followed by the operation B followed by the operation C is the operating procedure for the first-time first event illustrated in FIG. 2.

In the example of the operation history information 101 illustrated in FIG. 4, the first event, an operating procedure the operation A followed by the operation B followed by the operation D followed by the operation E, and an operating time of fifteen seconds are associated with each other. The operating procedure the operation A followed by the operation B followed by the operation D followed by the operation E is the operating procedure for the nth-time first event illustrated in FIG. 3.

In the example of the operation history information 101 illustrated in FIG. 4, the second event, an operating procedure the operation D followed by the operation E, and an operating time of two seconds are associated with each other. The operating procedure the operation D followed by the operation E is the operating procedure for the first-time second event illustrated in FIG. 2.

In the example of the operation history information 101 illustrated in FIG. 4, the second event, the operation F, and an operating time of one second are associated with each other. The operation F is the operating procedure for the nth-time second event illustrated in FIG. 3.

Figure 5:
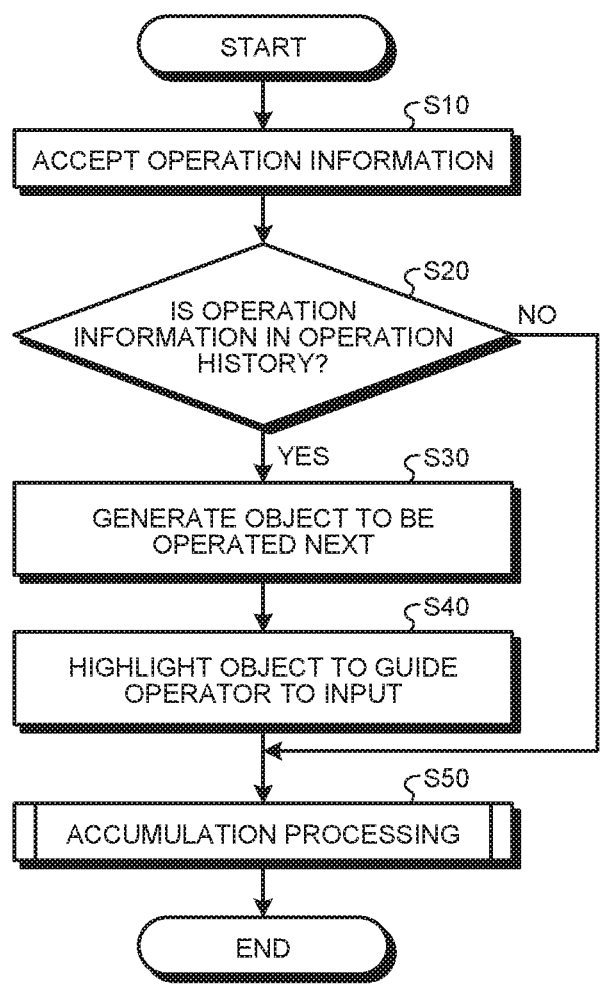
FIG. 5 is a flowchart illustrating a processing procedure of operation guidance according to the first embodiment.

Next, processing procedures of accumulation processing of the operation history information 101 and operation guidance processing executed by the display 10 will be described. FIG. 5 is a flowchart illustrating the operation guidance processing procedure according to the first embodiment. Operation guidance for the first event and operation guidance for the second event are the same processing, and thus the operation guidance for the first event will be described here.

When the control device 30 transmits event information to the display 10, the display unit 12 displays details of the event information. Thereafter, when information indicating selection of the first event is input to the input unit 11 by an operator, the display unit 12 displays a screen for accepting operation for the first event. When the operator performs operation on the display 10, in step S10, the input unit 11 accepts operation information indicating operation processing performed by the operator. The input unit 11 transmits the accepted operation information to the centralized processing unit 20. The operation information accepted by the input unit 11 is the operation for the first event, and may be one operation such as the operation A described in FIGS. 2 and 3, or may be a sequence of operating procedures such as the operation A and the operation B. Alternatively, the centralized processing unit 20 may select the first event on the basis of the importance of events, and the display unit 12 may display a screen for accepting operation for the first event selected by the centralized processing unit 20. An example of the importance of an event is the shortest operating time required for operation for the event.

In step S20, the centralized processing unit 20 determines whether an operating procedure that is the operation information from the input unit 11 is in the operation history information 101 stored in the storage unit 22. In other words, the centralized processing unit 20 determines whether the operation information accepted in step S10 is included in the accumulated operation histories. Specifically, when the operation information from the input unit 11 is the operation A, the centralized processing unit 20 determines whether there is an operation history in which the first operation is the operation A in the accumulated operation histories. When the operation information from the input unit 11 is a sequence of operating procedures of the operation A and the operation B, the centralized processing unit 20 determines whether there is an operation history in which the first operating procedures are the operation A followed by the operation B in the accumulated operation histories.

If the operation information is not included in the operation history information 101, that is, if No in step S20, in step S50, the centralized processing unit 20 executes accumulation processing that is processing to register new operation information in the operation history information 101.

On the other hand, when the operation information is included in the operation history information 101, that is, if Yes in step S20, the centralized processing unit 20 selects an operating procedure with the shortest operating time among operating procedures for the first event from within the operation history information 101. When the first event has occurred and operation for the first event has been started, the centralized processing unit 20 selects an operating procedure for eliminating the failure of the first event.

When the operating time of the operating procedure for the first-time first event is the shortest among operating procedures for the first event, the centralized processing unit 20 selects the operating procedure for the first-time first event. Thus, the centralized processing unit 20 determines an object to be operated next by the operator in the touch screen, on the basis of the selected operating procedure. Specifically, the centralized processing unit 20 sequentially selects unoperated one of the operations in the selected operating procedure in accordance with the operating procedure, and determines an object for performing the selected operation. Then, the centralized processing unit 20 transmits object information specifying the determined object to the display information generation unit 21. Consequently, in step S30, the display information generation unit 21 generates an object in a highlighted state that is the object to be operated next, on the basis of the object information transmitted from the centralized processing unit 20. Then, the display information generation unit 21 transmits the generated object to the display unit 12. Highlighting is processing to display an object to be operated next more noticeably than the other objects.

Thus, in step S40, the display unit 12 highlights the object, thereby guiding the operator to input. Then, the display 10 continues processing to accept operation from the operator while guiding the operator to input. At this time, in step S50, the display 10 executes the accumulation processing, which is processing to register new operation information in the operation history information 101, when accepting operation from the operator.

Figure 6:
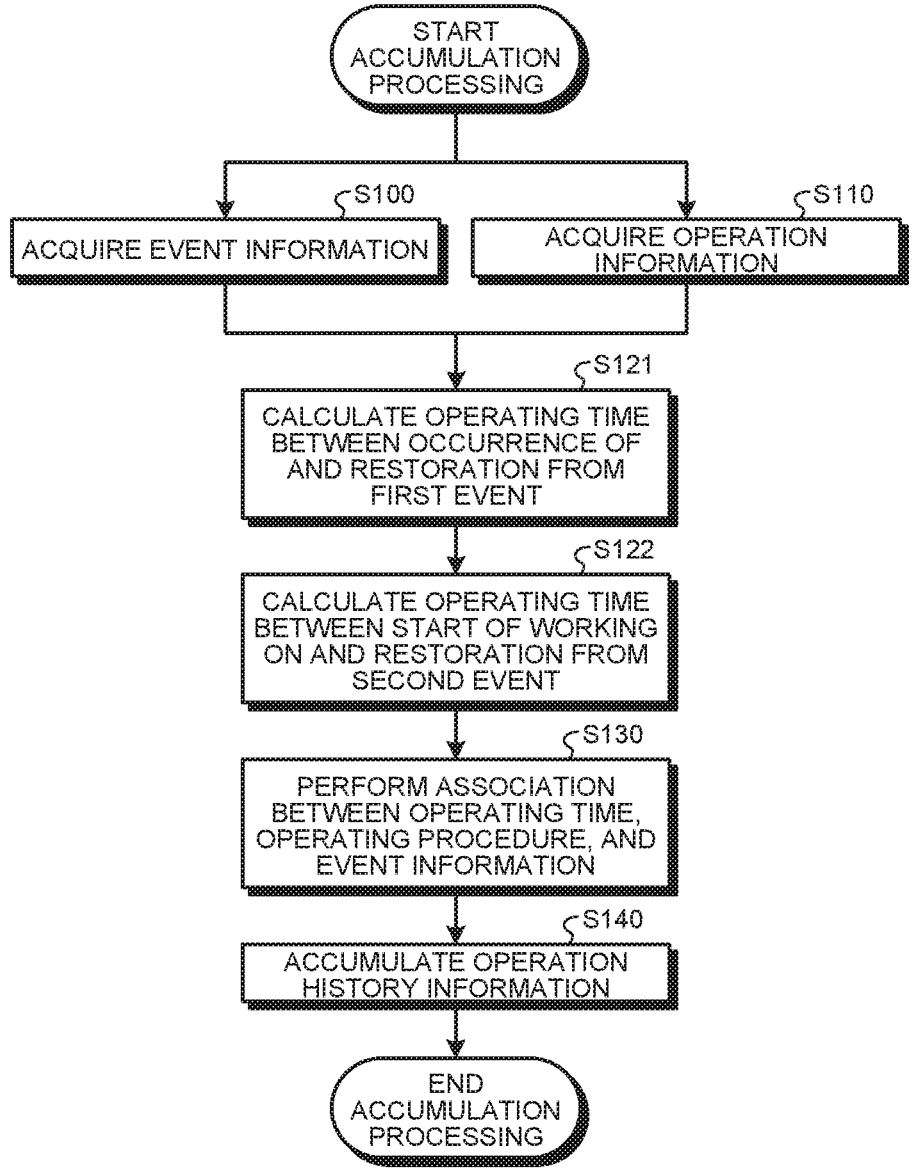
FIG. 6 is a flowchart illustrating a processing procedure of operation history information accumulation according to the first embodiment.

FIG. 6 is a flowchart illustrating the processing procedure of operation history information accumulation according to the first embodiment. When an event occurs, the communication I/F unit 13 receives event information from the control device 30. Then, the communication I/F unit 13 transmits the event information to the centralized processing unit 20. Thus, in step S100, the centralized processing unit 20 acquires the event information.

When a touch screen is pressed by the operator, the input unit 11 of the display 10 determines an operation corresponding to the pressed position and generates operation information. Then, the input unit 11 inputs the operation information to the centralized processing unit 20. Thus, in step S110, the centralized processing unit 20 acquires the operation information. The operation information acquired by the centralized processing unit 20 is one or a plurality of operating procedures. When the event occurs, the centralized processing unit 20 starts measuring time.

In step S121, the centralized processing unit 20 calculates an operating time that is the time between the occurrence of and the restoration from the first event. Further, in step S122, the centralized processing unit 20 calculates an operating time that is the time between the start of working on the second event and the restoration from the second event. The centralized processing unit 20 here calculates an operating time for each event, using the method described with FIGS. 2 and 3.

Then, in step S130, the centralized processing unit 20 associates the operating time for each event, the operating procedure for each event, and the event information with each other. Further, the centralized processing unit 20 stores the associated information in the operation history information 101 for each event. Then, in step S140, the centralized processing unit 20 accumulates the operation history information 101 in the storage unit 22. Thus, the display 10 completes the accumulation processing of the operation history information 101. When the accumulation processing of the operation history information 101 is completed, the display 10 returns to the processing in step S10 and repeats the processing in steps S10 to S50.

Figure 7:
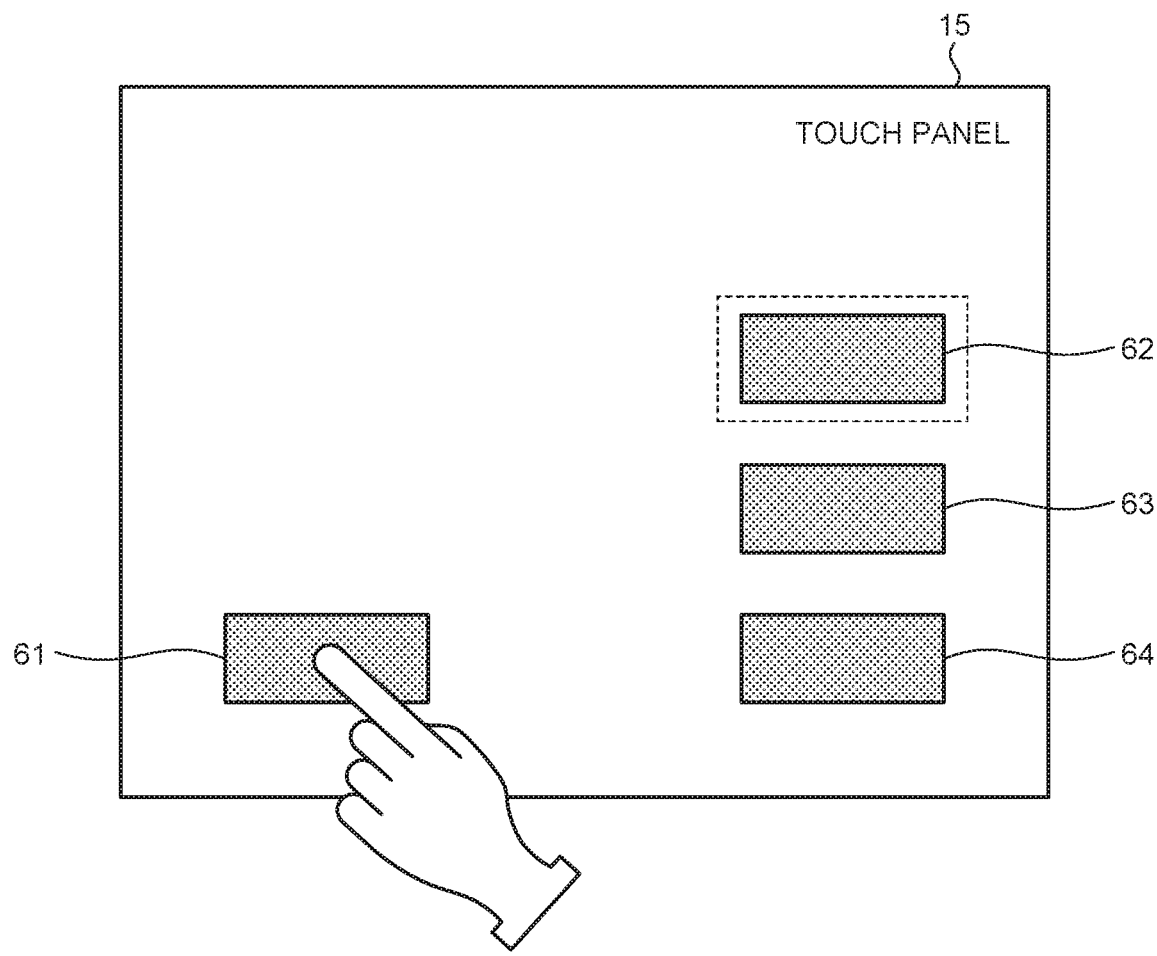
FIG. 7 is a diagram for explaining operation guidance processing according to the first embodiment.

Here, the operating procedure guidance processing by the display 10 will be described. FIG. 7 is a diagram for explaining the operation guidance processing according to the first embodiment. FIG. 7 illustrates an example of a screen of a touch panel 15. The touch panel 15 having the functions of the input unit 11 and the display unit 12 displays buttons 61 to 64 on the screen. The buttons 61 to 64 are buttons that can be pressed by an operator. Operations such as the operations A to F are assigned to the buttons 61 to 64. The touch panel 15 may display five or more buttons, or may display three or less buttons. The touch panel 15 may also display an object such as a numeric keypad for inputting a numerical value or a dial for increasing or decreasing a numerical value by a rotating operation.

The display 10 executes processing to accept operation from the operator while guiding the operator through an operating procedure. When an object to be operated next by the operator after the button 61 is pressed by the operator is the button 62, the display 10 highlights the button 62. Thereafter, when the button 62 is pressed by the operator, the display 10 highlights an object to be operated next by the operator.

When performing operation guidance for the second event, the display 10 highlights a button for the operation F after a button for the operation C that is the last operation among the operations for the first event is pressed.

A control system in which the display 10 and the control device 30 are disposed is managed by an administrator. Thus, the display 10 or the control device 30 may collect and manage data for the administrator, and the display 10 may display the data for the administrator. Alternatively, an external management device other than the control device 30 may collect and manage data for the administrator. The external management device in this case may receive data for the administrator from the control device 30 via a cloud computing system. A first example of data for the administrator managed by the display 10, the control device 30, or the external management device is the relationship between operating procedures and operating times. A second example of data for the administrator managed by the display 10, the control device 30, or the external management device is the relationship between events and operating times for the events.

Figure 8:
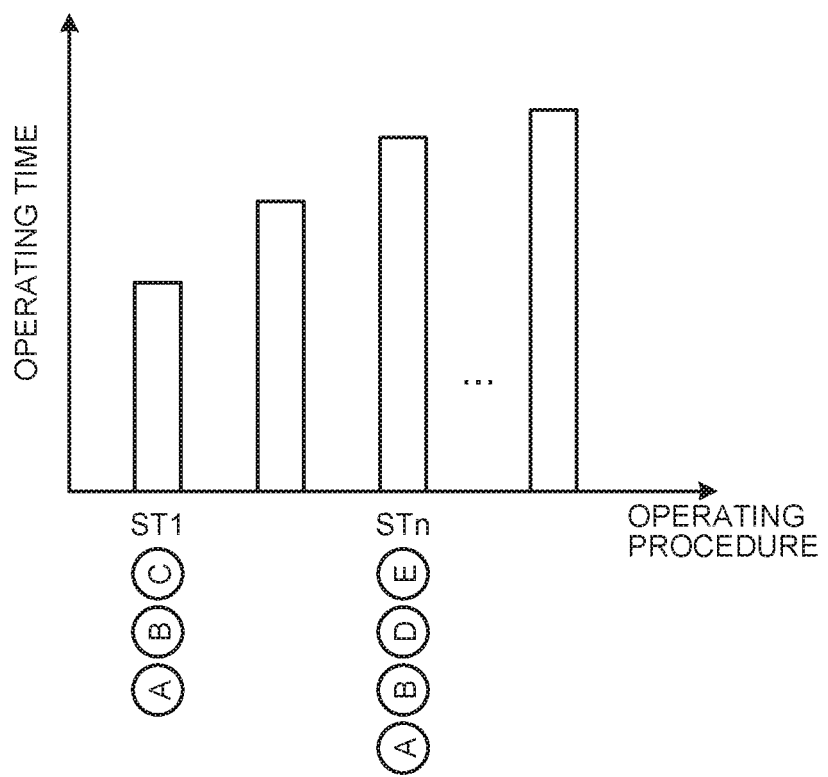
FIG. 8 is a graph illustrating a first example of data for an administrator according to the first embodiment.

FIG. 8 is a graph illustrating the first example of data for the administrator according to the first embodiment. FIG. 8 illustrates the relationships between operating procedures for a certain event and operating times when the operating procedures are performed. The horizontal axis in FIG. 8 represents the operating procedures, and the vertical axis in FIG. 8 represents the net operating times.

In FIG. 8, an operating procedure the operation A followed by the operation B followed by and the operation C is indicated by an operating procedure ST1. An operating procedure the operation A followed by the operation B followed by the operation D followed by the operation E is indicated by an operating procedure STn. The display 10 can sort and display information identifying operating procedures in order of increasing operating time, thereby clearly providing the administrator with an operating time required for each operating procedure, which is an information source for process improvement.

Figure 9:
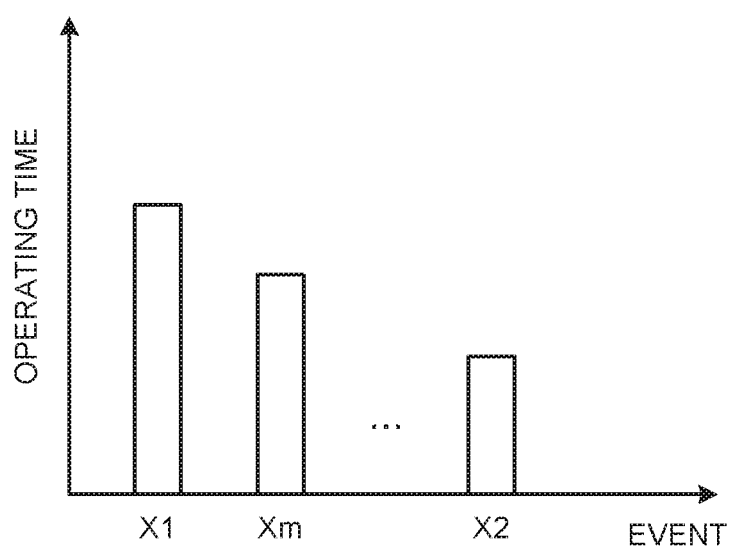
FIG. 9 is a graph illustrating a second example of data for an administrator according to the first embodiment.

FIG. 9 is a graph illustrating the second example of data for the administrator according to the first embodiment. FIG. 9 illustrates the relationships between the types of events and the net times of operating times for the events. The horizontal axis in FIG. 9 represents the events, and the vertical axis in FIG. 9 represents the net operating times.

In FIG. 9, the first event is indicated by a first event X1, an mth event where m is a natural number of three or more is indicated by an mth event Xm, and the second event is indicated by a second event X2. FIG. 9 illustrates the operating time for the first event X1, the operating time for the mth event Xm, and the operating time for the second event X2. The display 10 can sort and display information identifying events in order of decreasing operating time, thereby clearly providing the administrator with an operating time for each event, which is an information source for process improvement.

The centralized processing unit 20 of the first embodiment uses a sequence of operating procedures for operation guidance. For a key operation for inputting a parameter such as a numerical value, the parameter input varies depending on conditions; therefore, the centralized processing unit 20 may exclude a key operation for inputting a parameter from an operating procedure. Consequently, the centralized processing unit 20 can selectively use, for operation guidance, an operation to be performed in the same manner even under different conditions, excluding an operation that varies depending on conditions.

The centralized processing unit 20 may calculate an operating time, excluding the time from the end of the first event until operation for the second event by the operator is started, or may calculate an operating time without excluding it. An example of starting operation is a first button press for the second event by the operator.

When calculating an operating time, excluding the time until operation is started, the centralized processing unit 20 calculates an operating time between the start of a first operation for the second event by the operator and the end of the second event.

When calculating an operating time without excluding the time until operation is started, the centralized processing unit 20 calculates an operating time between the end of the first event and the end of the second event. The centralized processing unit 20 may calculate an operating time, excluding the time corresponding to the operation interval between operations by the operator.

The centralized processing unit 20 may calculate an operating time, excluding the time from the occurrence of the first event until operation for the first event by the operator is started, or may calculate an operating time without excluding it. An example of starting operation is a first button press for the first event by the operator.

When calculating an operating time, excluding the time until operation is started, the centralized processing unit 20 calculates an operating time between the start of a first operation for the first event by the operator and the end of the first event.

When calculating an operating time without excluding the time until operation is started, the centralized processing unit 20 calculates an operating time between the occurrence of the first event and the end of the first event.

The centralized processing unit 20 can calculate an accurate operating time by calculating an operating time, excluding the time until operation is started. The centralized processing unit 20 can easily calculate an operating time by calculating an operating time without excluding the time until operation is started. The centralized processing unit 20 can calculate an accurate operating time by calculating an operating time, excluding the time corresponding to an operation interval.

The centralized processing unit 20 may change the order of operation guidance by performing interruption or suspension on the basis of the importance of events during operation for an event by the operator. In this case, when the centralized processing unit 20 receives an event having higher importance than an event for which operation is being performed, the centralized processing unit 20 interrupts or suspends the operation being performed for the event, and accepts operation for the event having higher importance than the event for which the operation is being performed.

Specifically, when a third event that has occurred in the control device 30 is transmitted from the control device 30 during operation for the second event, the centralized processing unit 20 compares the importance of the second event with the importance of the third event. When the importance of the third event is higher than the importance of the second event, the centralized processing unit 20 interrupts or suspends the operation for the second event, and accepts operation for the third event. In this case, when the third event occurs during operation for the second event, the centralized processing unit 20 interrupts the operation for the second event to accept operation for the third event or suspends the acceptance of operation for the second event to accept operation for the third event. When accepting operation for the third event, the centralized processing unit 20 also guides the operator through an operating procedure. An example of the importance of an event is the shortest operating time required for operation for the event or a level set by the administrator. The centralized processing unit 20 determines that an event with a longer shortest operating time is an event of higher importance, and determines that an event with a higher level set by the administrator is of higher importance.

The control device 30 may be connected to a plurality of displays 10, and the plurality of displays 10 may accept operation. In this case, the centralized processing units 20 of the displays 10 may distribute operating procedures for events among a plurality of operators and then guide them in parallel. That is, the centralized processing units 20 may distribute a plurality of different events among different operators. In other words, the centralized processing unit 20 of the display 10 may cause a different display 10 to execute part of operation guidance to cause the different display 10 to display an operating procedure. In this case, the display 10 displays an operating procedure for a certain event, and a different display 10 displays an operating procedure for an event other than the certain event.

Specifically, a first centralized processing unit 20 of a first display 10 guides an operator through an operating procedure for the first event which is a first operating procedure, and a second centralized processing unit 20 of a second display 10 guides an operator through an operating procedure for the second event which is a second operating procedure. In this case, the first centralized processing unit 20 transmits the second operating procedure to the second centralized processing unit 20 via the control device 30. Alternatively, the second centralized processing unit 20 may transmit the first operating procedure to the first centralized processing unit 20 via the control device 30. Thus, the centralized processing units 20 can efficiently provide operation guidance to the control system including the plurality of displays 10. Alternatively, the control device 30 may assign operation for an event to each of the plurality of displays 10.

When it is necessary to display information to guide an operator across a plurality of screens, the centralized processing unit 20 of the display 10 may automatically switch the screens. In other words, when an operating procedure to be provided to an operator extends across a plurality of screens, the centralized processing unit 20 may automatically switch the screens to display the operating procedure. This eliminates the need for an operator to perform screen switching operation, allowing an operator to easily perform operation based on operation guidance.

The centralized processing unit 20 of the display 10 may change the fineness of operation guidance, on the basis of the skill level of an operator or the frequency of occurrence of an event. An example of the fineness of operation guidance is the number of times objects are highlighted during operation guidance. When the skill level of an operator is low or the frequency of occurrence of an event is low, the centralized processing unit 20 performs detailed operation guidance by increasing the number of times objects are highlighted. On the other hand, when the skill level of an operator is high or the frequency of occurrence of an event is high, the centralized processing unit 20 reduces the number of times objects are highlighted by omitting highlighting of objects on a certain screen. Thus, the centralized processing unit 20 can execute proper operation guidance based on the skill level of an operator or proper operation guidance based on the frequency of occurrence of an event.

During operation guidance, the centralized processing unit 20 of the display 10 may transmit input signals to the control device 30 without instructions from an operator, on the basis of a history of input signals to the control device 30. In this case, even if an operation is not performed by the operator, the display 10 inputs an input signal indicating that the operation has been performed to the control device 30, assuming that the operation has been virtually performed. In this case, processing for which an operation is assumed to have been performed may be an operation on a hardware switch other than the display 10 or may be a touch operation on a touch screen. This results in a reduction in the number of operations, thus allowing an operator to easily perform operation based on operation guidance.

The centralized processing unit 20 of the display 10 may automatically execute an operating procedure presented during operation guidance. In this case, even if operation by an operator is not performed, the centralized processing unit 20 automatically executes the operating procedure, assuming that operation has been performed according to the operating procedure. When one operation is performed by an operator, the centralized processing unit 20 of the display 10 may automatically execute the operating procedure. The centralized processing unit 20 of the display 10 may perform a simulation of an operating procedure to be presented during operation guidance, and evaluate the results of the simulation. This allows an operator to determine the validity of an operating procedure by simulation before performing operation.

When a device selects an operating procedure on the basis of the frequency of operation as before, the amount of information held for extracting a proper operating procedure becomes large. Thus, if the display is a general-purpose device, it is difficult to provide an operating procedure in real time. Further, when an operating procedure is selected based on the frequency of operation and an operation of parameter setting is included in the middle of the operating procedure, the operation of parameter setting cannot be excluded. Furthermore, when an operating procedure is selected based on the frequency of operation, a proper operating procedure with a short operating time cannot be selected.

By contrast, the display 10 of the first embodiment does not need to store the frequency of operation, so that the amount of information stored can be reduced. Further, if an operation of parameter setting is included in the middle of an operating procedure, the display 10 can exclude the operation of parameter setting. Moreover, since the display 10 calculates a net operating time, it can select a proper operating procedure with a short operating time.

Figure 10:
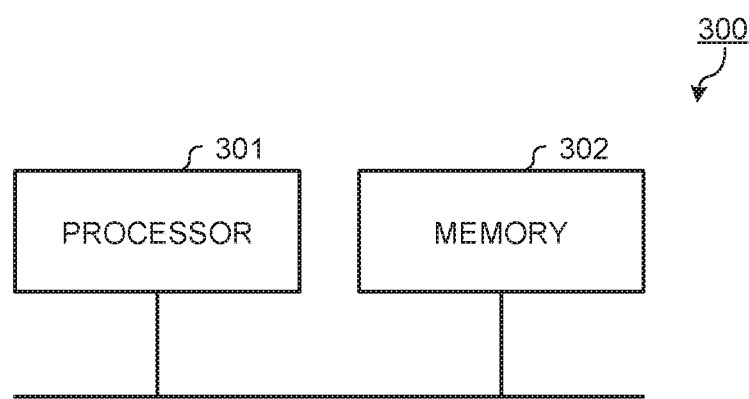
FIG. 10 is a diagram illustrating an example of a hardware configuration of a centralized processing unit included in the display according to the first embodiment.

Next, the hardware configuration of the centralized processing unit 20 will be described. FIG. 10 is a diagram illustrating an example of a hardware configuration of the centralized processing unit included in the display according to the first embodiment. The centralized processing unit 20 can be implemented by a control circuit 300 illustrated in FIG. 10, that is, a processor 301 and memory 302. Examples of the processor 301 are a Central Processing Unit (CPU, also called a central processor, a processing unit, an arithmetic unit, a microprocessor, a microcomputer, a processor, and a DSP) and a system Large Scale Integration (LSI). Examples of the memory 302 are Random Access Memory (RAM), Read Only Memory (ROM), and a flash memory.

The centralized processing unit 20 is implemented by the processor 301 reading and executing a program stored in the memory 302 for executing the operation of the centralized processing unit 20. The program can be said to cause a computer to execute a procedure or method in the centralized processing unit 20. The memory 302 is also used as temporary memory when the processor 301 executes various kinds of processing.

Thus, the program executed by the processor 301 is a computer program product including a non-transitory computer-readable recording medium including a plurality of instructions for performing data processing, which can be executed by a computer. The program executed by the processor 301 has a plurality of instructions that cause a computer to execute data processing.

The centralized processing unit 20 may be implemented by dedicated hardware. The functions of the centralized processing unit 20 may be implemented partly by dedicated hardware and partly by software or firmware.

As described above, according to the first embodiment, the centralized processing unit 20 calculates a net operating time that is the time between the end of the first event and the end of the second event. Thus, even when a plurality of events occur, an operating time for the second event can be accurately calculated. The centralized processing unit 20 selects an operating procedure used for operation guidance, on the basis of accurately calculated operating times. Thus, even when a plurality of events occur, the centralized processing unit 20 can guide an operator through a proper operating procedure that allows operation to be completed in a short time for each event.

Second Embodiment

Next, a second embodiment of the invention will be described with reference to FIGS. 11 and 12. In the second embodiment, a machine learning device learns an operating procedure used for operation guidance, on the basis of an operating time between the end of the first event and the end of the second event and the number of operations for responding to the second event. An operating time used in the second embodiment is an operating time used in the first embodiment.

First, a display system of the second embodiment will be described. The display system of the second embodiment includes the display 10 of the first embodiment and a machine learning device. The following illustrates, as an example of the display system, a display 10X obtained by integrating the display 10 and the machine learning device. A machine learning device 23 may be integrated with the display 10X or may be provided outside the display 10X.

Figure 11:
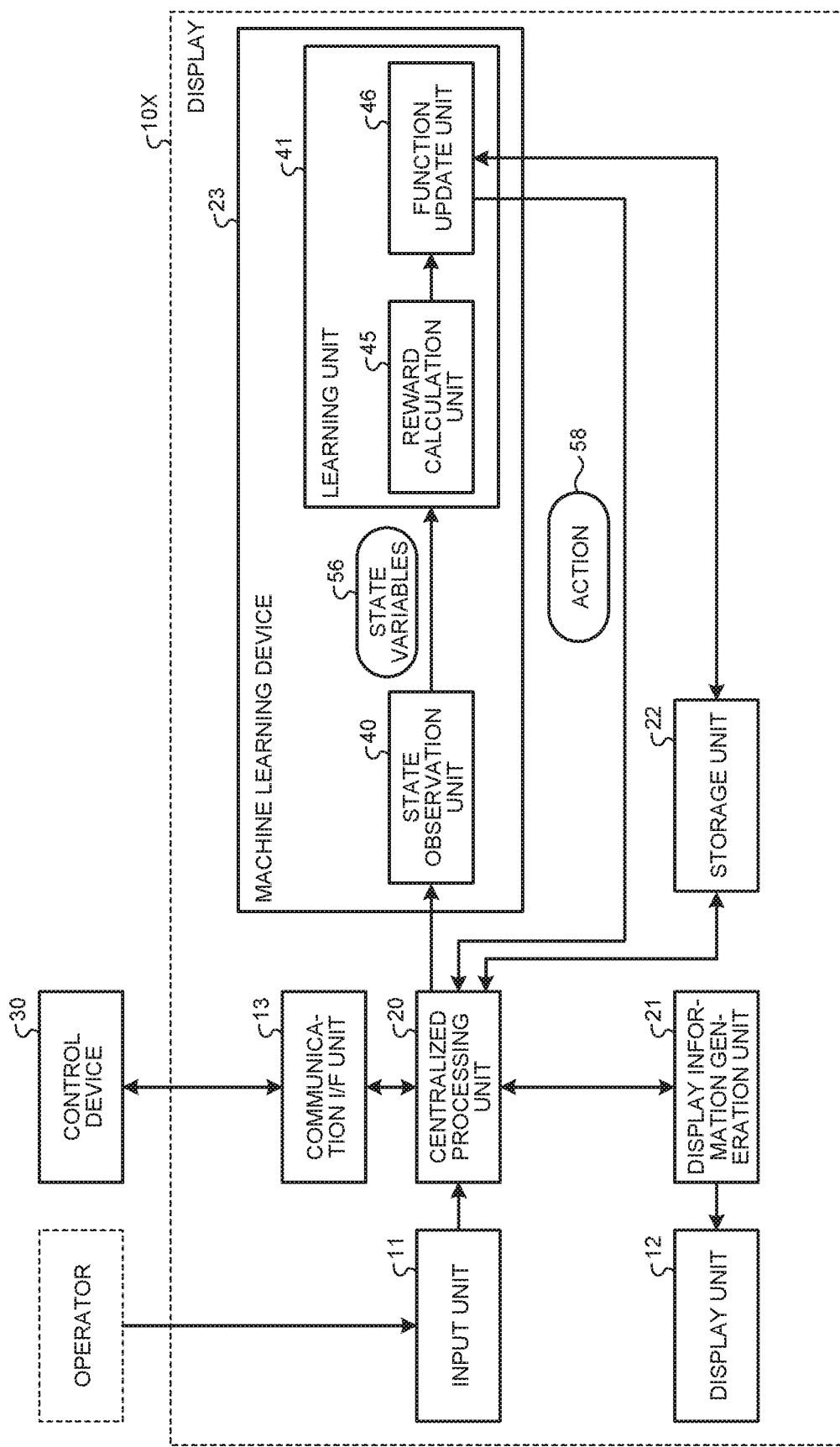
FIG. 11 is a diagram illustrating the configuration of a display according to a second embodiment of the present invention.
Figure 12:
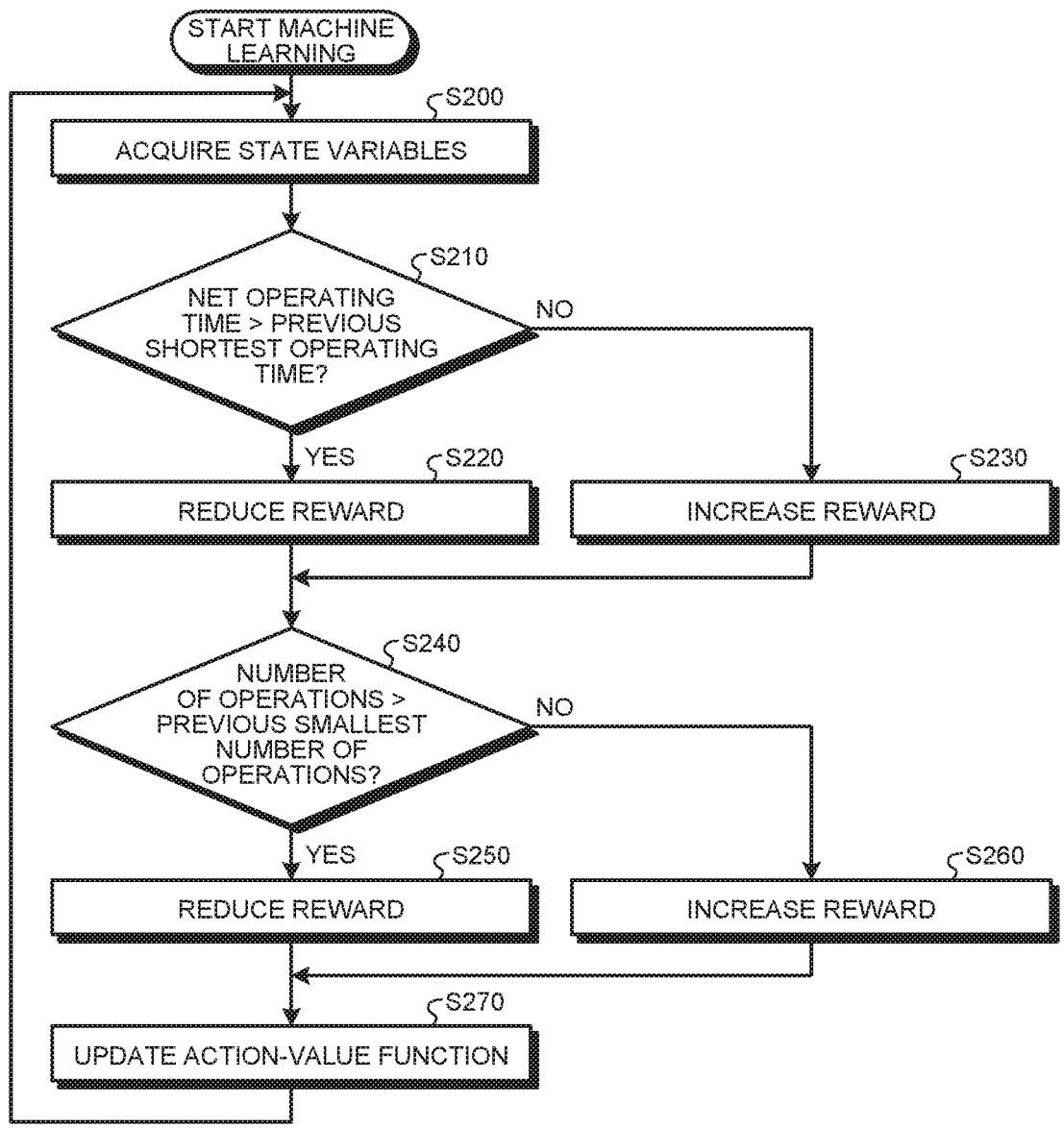
FIG. 12 is a flowchart illustrating an action-value function update procedure by a machine learning device according to the second embodiment.

FIG. 11 is a diagram illustrating the configuration of the display system according to the second embodiment of the present invention. Of the components in FIG. 11, the same reference numerals are assigned to components achieving the same functions as those of the display 10 of the first embodiment illustrated in FIG. 1, and duplicated explanations are omitted. The display 10X includes the machine learning device 23 that learns an operating procedure, in addition to the components of the display 10. That is, the display system that learns and displays an operating procedure includes the display 10 and the machine learning device 23. The machine learning device 23 may be disposed inside the display 10X or may be disposed outside the display 10X. The second embodiment describes a case where the machine learning device 23 is disposed inside the display 10X.

The machine learning device 23 includes a state observation unit 40 and a learning unit 41. The state observation unit 40 is connected to the centralized processing unit 20 and the learning unit 41. The learning unit 41 is connected to the storage unit 22.

The state observation unit 40 observes, from the centralized processing unit 20, an operating time between the end of the first event and the end of the second event, the number of operations that is the number of operations for the second event, and an operating procedure for the second event, as state variables 56. The operating time and the number of operations acquired by the state observation unit 40 are associated with the operating procedure. The state observation unit 40 transmits the state variables 56, which are the observation results, to the learning unit 41.

The learning unit 41 learns an action 58 that is the next operating procedure according to the state variables 56. In other words, the learning unit 41 learns an operating procedure with a shorter operating time and a smaller number of operations. Specifically, the learning unit 41 learns input operation according to a training data set created based on the state variables 56 including the operating time, the number of operations, and the operating procedure.

The learning unit 41 includes a reward calculation unit 45 and a function update unit 46. The reward calculation unit 45 calculates reward on the basis of the state variables 56. Specifically, the reward calculation unit 45 calculates reward on the basis of the net operating time calculated by the centralized processing unit 20. The reward calculation unit 45 gives a larger reward as the operating time is shorter. The reward calculation unit 45 gives a larger reward as the number of operations is smaller. The reward calculation unit 45 may weigh reward to the operating time and reward to the number of operations. In this case, for the reward to the operating time, the reward calculation unit 45 gives reward that varies more greatly than reward to the number of operations. For example, the reward calculation unit 45 gives a reward of "+1" to "−1" to the operating time, and gives a reward of "+0.2" to "−0.2" to the number of operations.

The reward calculation unit 45 may give reward to the number of operations only when the difference between the operating time calculated by the centralized processing unit 20 and the minimum value of operating times stored in the storage unit 22 is a difference within the error range, that is, only a specific time. In this case, when there is a difference greater than the specific time, the reward calculation unit 45 gives reward to the operating time and does not give reward to the number of operations. The reward calculation unit 45 transmits calculated reward to the function update unit 46.

The function update unit 46 stores a function for determining the action 58, and updates the function for determining the action 58 on the basis of reward. An example of the function for determining the action 58 is an action-value function $Q(s_t, a_t)$ described later. The function update unit 46 of the second embodiment updates the action-value function $Q(s, a)$ every time the input unit 11 is operated and the state of the device to be controlled is restored. The function update unit 46 calculates the action 58 using the updated action-value function $Q(s, a)$. The function update unit 46 transmits the calculated action 58 to the centralized processing unit 20, and transmits the updated action-value function $Q(s, a)$ to the storage unit 22.

The storage unit 22 of the second embodiment stores previous learned data and data used for learning. An example of the learned data is a learned processing procedure, and an example of the data used for learning is the action-value function $Q(s, a)$ used by the learning unit 41 during learning. A processing procedure stored in the storage unit 22 is a processing procedure having the highest reward among the past operating times. The storage unit 22 stores, for each type of event, a processing procedure having the highest reward among the past operating times and a combination of an operating time and the number of operations corresponding to the processing procedure. When the same event occurs next time, the processing procedure stored in the storage unit 22 is read by the centralized processing unit 20 and displayed on the display unit 12.

The learning unit 41 may use any learning algorithm. Here, as an example, a case where reinforcement learning is applied to a learning algorithm will be described. In reinforcement learning, an agent that takes actions in a certain environment observes a current state indicated by the state variables 56, and determines the action 58 to take on the basis of the observation results. The agent obtains reward from the environment by selecting the action 58, and learns a policy to obtain the most reward through a series of actions 58. As typical methods of reinforcement learning, Q-Learning and TD-Learning are known. For example, for Q-Learning, an action-value table that is a typical update equation of the action-value function $Q(s, a)$ is expressed by the following formula (1). That is, an example of the action-value table is the action-value function $Q(s, a)$ of formula (1).

[Formula 1]

$$Q(s_t,a_t) \leftarrow Q(s_t,a_t)+\alpha(r_{t+1}+\gamma \max Q(s_{t+1},a)-Q(s_t,a_t)) \quad (1)$$

In formula (1), $s_t$ represents an environment at a time t, and $a_t$ represents an action at the time t. By the action $a_t$, the environment changes to $s_{t+1}$. $r_{t+1}$ represents a reward given due to the environmental change, $\gamma$ represents a discount factor, and a represents a learning rate. When Q-Learning is applied, operation input is the action $a_t$.

In the update equation represented by formula (1), if the action value of the best action a at a time t+1 is larger than the action value Q of the action a performed at the time t, the action value Q is increased. In the opposite case, the action value Q is reduced. In other words, the action-value function Q(s, a) is updated such that the action value Q of the action a at the time t approaches the best action value at the time t+1. Consequently, the best action value in a certain environment is sequentially propagated to an action value in a previous environment.

For example, when an operating time is shorter than the stored former operating time, the reward calculation unit 45 increases reward r. At this time, the reward calculation unit 45 gives a reward of "1", for example. On the other hand, when the operating time is longer than the former operating time, the reward calculation unit 45 reduces the reward r. At this time, the reward calculation unit 45 gives a reward of "−1", for example. When the number of operations is smaller than the stored former number of operations, for example, the reward calculation unit 45 increases the reward r. At this time, the reward calculation unit 45 gives a reward of "0.2", for example. On the other hand, when the number of operations is larger than the former number of operations, the reward calculation unit 45 reduces the reward r. At this time, the reward calculation unit 45 gives a reward of "−0.2", for example.

The function update unit 46 updates the function for determining input operation that is the action 58, according to reward calculated by the reward calculation unit 45. For example, for Q-learning, the action-value function $Q(s_t, a_t)$ represented by formula (1) is the function for calculating the action 58, and the action-value function $Q(s_t, a_t)$ is updated by the function update unit 46.

Next, a processing procedure of a reinforcement learning method for updating the action-value function $Q(s_t, a_t)$ will be described. FIG. 12 is a flowchart illustrating an action-value function update procedure by the machine learning device according to the second embodiment.

When an event occurs, the display unit 12 displays information for guiding an operator through an operating procedure. When the input unit 11 accepts operation from an operator, the centralized processing unit 20 creates the operation history information 101 in which the event that has occurred, an operating procedure for the event performed by the operator, an operating time, and the number of operations are associated with each other.

The state observation unit 40 acquires the operation history information 101 as the state variables 56 from the centralized processing unit 20 (step S200). The state observation unit 40 transmits the state variables 56 to the reward calculation unit 45. That is, the state observation unit 40 transmits information in which the event, the operating procedure, and the net operating time are associated with each other to the reward calculation unit 45.

The reward calculation unit 45 determines whether the net operating time acquired from the state observation unit 40 is longer than the previous shortest operating time stored in advance (step S210). When the net operating time is longer than the previous shortest operating time stored in advance (step S210, Yes), the reward calculation unit 45 reduces the reward (step S220).

On the other hand, when the net operating time is shorter than or equal to the previous shortest operating time stored in advance (step S210, No), the reward calculation unit 45 increases the reward (step S230). The reward calculation unit 45 may increase the reward when the net operating time is shorter than the previous shortest operating time stored in advance. When the net operating time is the same as the previous shortest operating time stored in advance, the reward calculation unit 45 may maintain the reward without reducing or increasing it.

The reward calculation unit 45 determines whether the number of operations acquired from the state observation unit 40 is larger than the previous smallest number of operations stored in advance (step S240). When the number of operations is larger than the previous smallest number of operations stored in advance (step S240, Yes), the reward calculation unit 45 reduces the reward (step S250).

On the other hand, when the number of operations is smaller than or equal to the previous smallest number of operations stored in advance (step S240, No), the reward calculation unit 45 increases the reward (step S260). The reward calculation unit 45 may increase the reward when the number of operations is smaller than the previous smallest number of operations stored in advance. When the number of operations is the same as the previous smallest number of operations stored in advance, the reward calculation unit 45 may maintain the reward without reducing or increasing it.

The function update unit 46 updates the action-value function $Q(s_t, a_t)$, on the basis of the increased or reduced reward (step S270). Thereafter, the display 10X returns to step S200 again, and determines an action value Q for newly input state variables 56. The display 10X repeatedly executes the processing in steps S200 to S270 in a certain cycle.

When the same event as an event stored in the storage unit 22 occurs in the device to be controlled, the display 10X displays an operating procedure stored in the storage unit 22. This allows guiding the operator to operation using an operating procedure with a short operating time and a small number of operations.

Although the second embodiment has described the case where the machine learning device 23 performs machine learning using reinforcement learning, the machine learning device 23 may perform machine learning according to a different known method, for example, a neural network, genetic programming, function logic programming, or a support vector machine.

Thus, according to the second embodiment, the machine learning device 23, which learns an operating procedure associated with an operating time and the number of operations, can correctly learn an operating time and the number of operations for the second event even when a plurality of events occur. This allows an operator to be guided through a proper operating procedure that allows operation to be completed easily in a short time for each event even when a plurality of events occur.

The configurations illustrated in the above embodiments illustrate an example of the subject matter of the present invention, and can be combined with another known art, and can be partly omitted or changed without departing from the scope of the present invention.

REFERENCE SIGNS LIST 10, 10X display; 11 input unit; 12 display unit; 13 communication I/F unit; 15 touch panel; 20 centralized processing unit; 21 display information generation unit; 22 storage unit; 23 machine learning device; 40 state observation unit; 41 learning unit; 45 reward calculation unit; 46 function update unit; 56 state variables; 58 action; 30 control device; 61 to 64 button; 101 operation history information.

The invention claimed is:

1. A display comprising:
a calculation circuit to set, when a first event and a second event that occur in an external device are transmitted from the external device and operation for the first event and operation for the second event are performed, a timing when the first event is ended by the operation for the first event as a timing to start the operation for the second event and calculate an operating time that is a time from when the first event is ended to when the second event is ended by the operation for the second event;

a storage to store operating procedures that are histories of the operation for the second event and the operating times associated with the operating procedures; and an operating procedure display to display any of the operating procedures in the storage, according to an instruction from the calculation circuit, wherein, when the second event is newly transmitted after the calculation of the operating time is completed, the calculation circuit selects an operating procedure used for operation guidance from among the operating procedures in the storage on a basis of the operating times in the storage and causes the operating procedure display to display the selected operating procedure, thereby executing the operation guidance.

2. The display according to claim 1, wherein the calculation circuit selects an operating time that is a shortest operating time from among the operating times in the storage, and selects and displays an operating procedure associated with the selected operating time as an operating procedure used for the operation guidance.

3. The display according to claim 1, wherein the calculation circuit calculates the operating time, excluding a time from when the first event is ended to when the operation for the second event is started.

4. The display according to claim 1, wherein the calculation circuit calculates the operating time, excluding a time corresponding to an operation interval between operations for the second event.

5. The display according to claim 1, wherein,
when a third event that occurs in the external device is transmitted from the external device during the operation for the second event, the calculation circuit interrupts or suspends the operation for the second event to accept operation for the third event if importance of the third event is higher than importance of the second event.

6. The display according to claim 1, wherein the calculation circuit causes a different display to display an operating procedure of the operation for the first event.

7. The display according to claim 1, wherein the calculation circuit causes the operating procedure display to sort and display information identifying a plurality of events that occur in the external device, on a basis of operating times for the events.

8. The display according to claim 1, wherein the calculation circuit causes the operating procedure display to sort and display information identifying the operating procedures, on a basis of the operating times associated with the operating procedures.

9. The display according to claim 1, wherein,
when the selected operating procedure is displayed across a plurality of screens, the calculation circuit causes the operating procedure display to display the selected operating procedure by switching the plurality of screens.

10. The display according to claim 1, wherein the calculation circuit changes fineness of the operation guidance, on a basis of a skill level of an operator who receives the operation guidance or frequency of occurrence of the second event.

11. A display method comprising:
setting, when a first event and a second event that occur in an external device are transmitted from the external device and operation for the first event and operation for the second event are performed, a timing when the first event is ended by the operation for the first event as a timing to start the operation for the second event and calculating an operating time that is a time from when the first event is ended to when the second event is ended by the operation for the second event;

storing operating procedures that are histories of the operation for the second event and the operating times associated with the operating procedures; and selecting, when the second event is newly transmitted after the calculation of the operating time is completed, an operating procedure used for operation guidance from among the operating procedures on a basis of the operating times; and displaying the selected operating procedure to execute the operation guidance.

* * * * *